United States Patent
Willers et al.

(10) Patent No.: US 7,823,289 B2
(45) Date of Patent: Nov. 2, 2010

(54) METHOD FOR PRODUCING VALVE HOUSINGS, AND A VALVE HOUSING

(75) Inventors: Eike Willers, Stuttgart (DE); Andreas Auweder, Vaihingen/Eng (DE)

(73) Assignee: Behr Thermot-Tronik GmbH, Kornwestheim (DE)

( * ) Notice: Subject to any disclaimer, the term of this patent is extended or adjusted under 35 U.S.C. 154(b) by 875 days.

(21) Appl. No.: 11/655,367

(22) Filed: Jan. 19, 2007

(65) Prior Publication Data

US 2007/0164249 A1 Jul. 19, 2007

(30) Foreign Application Priority Data

Jan. 19, 2006 (DE) .................. 10 2006 003 259

(51) Int. Cl.
*B21D 51/16* (2006.01)
(52) U.S. Cl. .................. 29/890.128; 29/890.12; 29/890.124; 29/412; 29/415; 29/417; 29/418
(58) Field of Classification Search .............. 29/890.12, 29/890.124, 890.128, 890.132, 557, 558, 29/417, 412, 415, 418; 251/366
See application file for complete search history.

(56) References Cited

U.S. PATENT DOCUMENTS

| 1,825,042 | A | * | 9/1931 | Baldwin, Jr. ........... 29/890.132 |
| 2,309,666 | A | | 2/1943 | Parker ...................... 29/157 |
| 2,420,785 | A | * | 5/1947 | Lorraine ................ 137/625.47 |
| 2,669,011 | A | | 2/1954 | Brumbaugh ............. 29/157.1 |
| 3,345,032 | A | * | 10/1967 | Rawstron .................... 251/172 |
| 3,417,450 | A | * | 12/1968 | Zell ...................... 29/890.132 |
| 3,886,638 | A | | 6/1975 | Hayman et al. ........... 29/157.1 |
| 4,288,103 | A | * | 9/1981 | Gallagher et al. ............. 285/39 |
| 6,253,837 | B1 | | 7/2001 | Seiler et al. ................ 165/103 |
| 7,025,330 | B2 | * | 4/2006 | Massey .................. 251/315.1 |

FOREIGN PATENT DOCUMENTS

| DE | 296 14 204 U1 | 11/1996 |
| DE | 199 01 253 A1 | 7/2000 |
| DE | 103 49 318 A1 | 5/2005 |

OTHER PUBLICATIONS

German Search Report.
European Search Report.

* cited by examiner

*Primary Examiner*—David P Bryant
*Assistant Examiner*—Ryan J Walters
(74) *Attorney, Agent, or Firm*—K&L Gates LLP

(57) ABSTRACT

In a valve housing 11, which is constituted by an section of an extruded billet material, into which are formed inlet and outlet conduits 27, 28, 29, 30, which are substantially arranged in a common plane, and a receiving bore 20 for at least one valve element 21, 26, arranged transversely in relation thereto, the billet material is formed as a profiled element provided with ribs 15, 16, 17, 18 which project from a substantially parallelepiped base body and in which ribs the inlet and outlet conduits 27, 28, 29, 30 open.

5 Claims, 2 Drawing Sheets

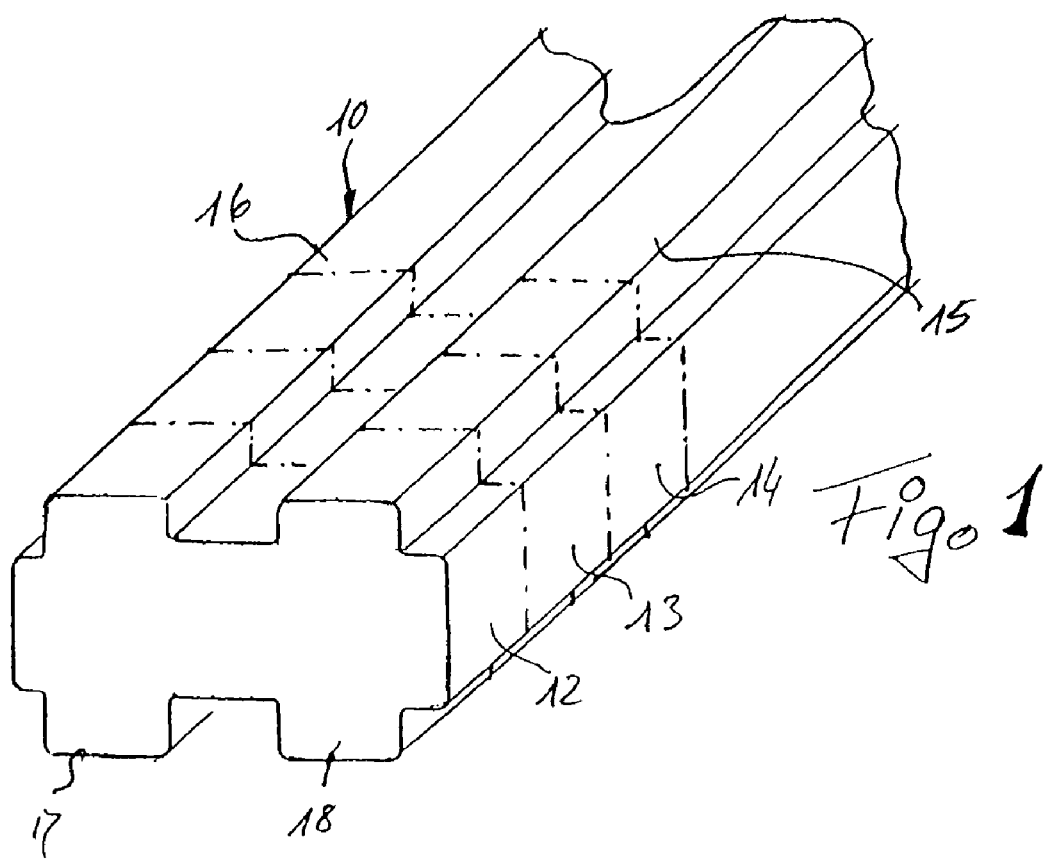
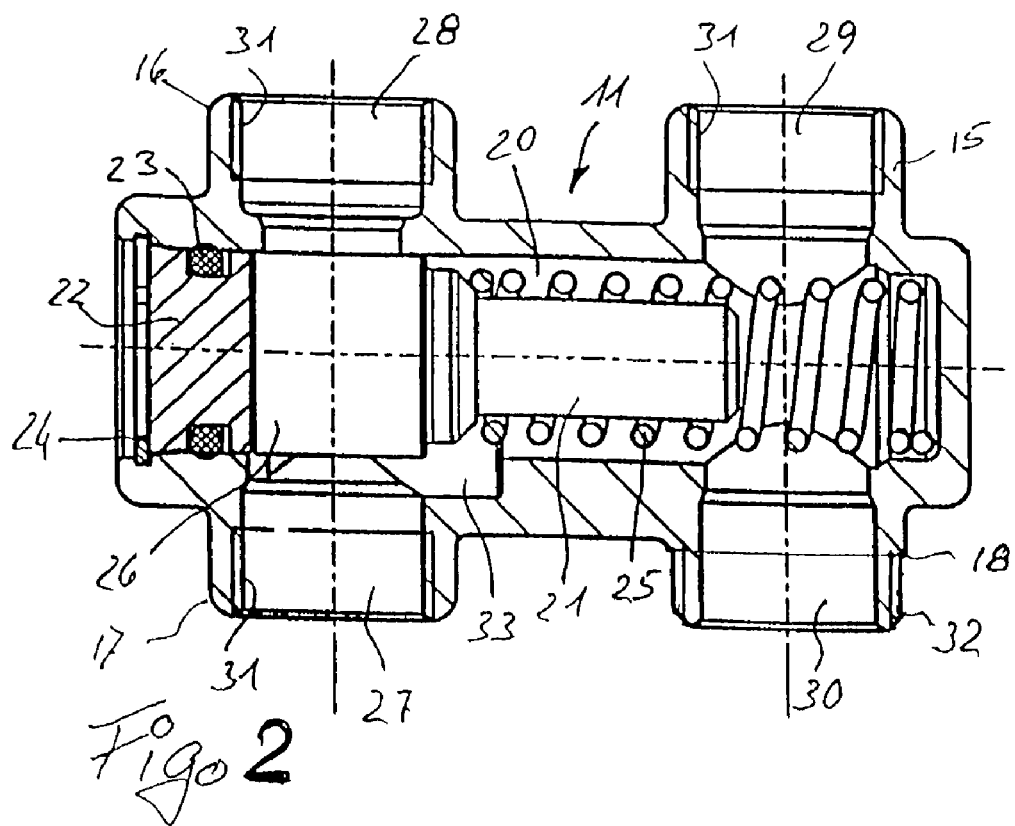

METHOD FOR PRODUCING VALVE HOUSINGS, AND A VALVE HOUSING

CROSS-REFERENCES TO RELATED APPLICATIONS

This application claims the benefit of German patent application 10 2006 003 259.4 filed Jan. 19, 2006, herein incorporated by reference.

FIELD OF THE INVENTION

The invention relates to a method for producing valve housings. More particularly, the invention relates to such a method performed by cutting sections off an extruded billet material and by working into the sections inlet and outlet conduits, which are substantially arranged in a common plane, and for producing a receiving bore, which extends transversely to the inlet conduits and is substantially arranged in a common plane, for at least one valve element. The invention further relates to a valve housing.

BACKGROUND OF THE INVENTION

It is known to arrange the valve corresponding to FIGS. 5 and 6 of U.S. Pat. No. 6,253,837 in a valve housing which was produced from a section of an extruded billet material. A receiving bore, which extends in the extruding direction, is worked into the section cut off the billet material. Further bores are worked transversely thereto into the section and terminate in the receiving bore and are used as inlet conduits and outlet conduits. The extruded billet material has an essentially rectangular base body, which is provided with partially cylindrical thickenings on both sides, in whose area the receiving bore for the valve element is attached.

OBJECT AND SUMMARY OF THE INVENTION

An object of the invention to reduce the production costs and in particular the costs for the material of the valve housing of the type described above.

This object is addressed in that the billet material is shaped as a substantially parallelepiped base body with protruding ribs, with the inlet conduits and outlet conduits opening at the ribs.

The invention makes it possible to substantially reduce the amount of material used in the production of such valve housings. This is a considerable advantage, in particular when the valve housings are employed as thermostatic valves in motor vehicles, since these thermostatic valves are required in large numbers.

In an embodiment of the invention, the rib in the area of at least one inlet conduit and/or outlet conduit is reshaped into a peg which is provided with an exterior thread. The reshaping of a rib after the section constituting the valve housing has been cut off the billet material requires a relative small outlay and results in only a small amount of waste material. It is therefore possible without a large outlay to provide a peg with an exterior thread which can be used for attaching a connecting line by means of a union nut. For some applications this is of considerable advantage, in particular also for holding the valve housing and/or connecting lines.

In a further embodiment of the invention, the inlet conduits and/or the outlet conduits and/or the receiving bores for several valve housings are cut into the billet material, prior to being subsequently divided into individual valve housings. In this manner, it is possible to considerably reduce the number of chucking operations for machining processes required for cutting the inlet conduits, the outlet conduits and the receiving bore. Thus, it is possible to further reduce the production costs.

The object of the invention is addressed in connection with a valve housing such that the billet material is profiled and provided with ribs which project away from a substantially parallelepiped base body and at which the inlet and outlet conduits open.

In a preferred embodiment, the receiving bore, as well as the inlet conduits and the outlet conduits, extend transversely in regard to the extrusion direction of the billet material. It is possible in this manner to provide inlet conduits, outlet conduits and the receiving bore in the billet material, which only subsequently is divided into individual valve housings. In this way, it is possible to considerably reduce the number of chucking operations for machining processes in the course of cutting the inlet conduits, the outlet conduits and the receiving bore, because of which the production time can be correspondingly reduced.

Further characteristics and advantages of the invention ensue from the following description of the embodiments represented in the drawings.

BRIEF DESCRIPTION OF THE DRAWINGS

FIG. 1 shows a perspective representation of a billet material which is the basic material for valve housings, FIG. 2 is a section through a valve housing constituted from the billet material in accordance with FIG. 1, with a thermostatic valve.

DETAILED DESCRIPTION OF THE PREFERRED EMBODIMENTS

Figure 3:
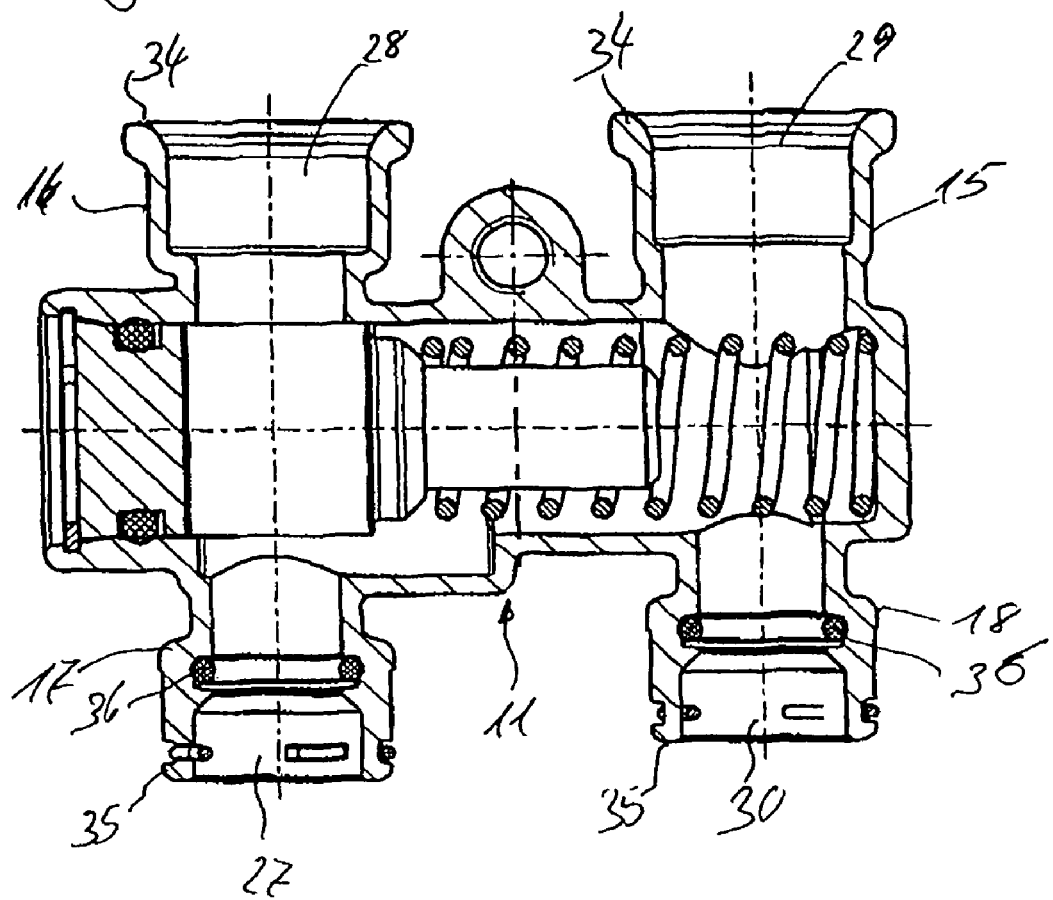
FIG. 3 is a section similar to FIG. 2 of a further embodiment.

The profiled cast or extruded element 10 represented in FIG. 1 is used as the basic material for valve housings 11, such as shown in detail in FIG. 2. The profiled cast or extruded element 10, which is formed from a material suitable for these processes, is cut into individual sections 12, 13, 14, each of which is used as a valve housing.

The profiled element 10 has a parallelepiped base body, from the flat sides of which ribs 15, 16, 17, 18 protrude, which extend in the longitudinal direction (extrusion direction). In the exemplary embodiment, the profiled element 10 has an H-shaped cross section, in which pairs of the ribs 15, 18 and 16, 17 are located opposite each other. It is of course possible to provide a different arrangement of the ribs 15 to 18, in particular an arrangement in which the ribs are not located in pairs opposite each other, but are offset in respect to each other.

A receiving bore 20, which extends transversely in respect to the extrusion direction, and therefore also transversely in respect to the longitudinal direction of the ribs 15 to 18, has been cut into each section 12, 13, 14 of the base body from the direction of a narrow side. In the exemplary embodiment, a thermostatic actuating element is arranged in the receiving bore 20, which contains a housing 21 filled with an expandable material whose volume changes as a function of temperature. Depending on the temperature, a working piston, not represented, is extended from the housing 21 and is supported on a plug 22 which closes the receiving bore. The plug 22 is provided with a sealing ring 23. The sealing ring 23 is maintained in the receiving bore 20 by means of a retaining ring 24. The housing 21 of the thermostatic actuating element is spring-loaded by means of a restoring spring, which acts on the housing opposite the extension direction of the non-visible piston in the direction toward the plug 22. The restoring spring 25 is supported on the closed end of the receiving bore 20 of the valve housing 11.

A valve slider element 26 is fixedly connected with the housing 21 of the thermostatic actuating element and is guided in the receiving bore 20. In the cold state, i.e. as long as the working piston of the thermostatic actuating element has not yet been extended from the housing 21, the valve slider element 26 blocks the connection between an inlet conduit 27 and an outlet conduit 28 located opposite the latter. The inlet conduit 27 starts in the rib 17. The outlet conduit 28 starts in the rib 16. A further inlet conduit 29 and a further outlet conduit 30 start in the ribs 15 and 18. The inlet conduits 27, 29, the outlet conduits 28, 30 and the receiving bore 20 are substantially located on a common plane extending perpendicularly in relation to the longitudinal direction of the ribs 15, 16, 17, 18, i.e. in relation to the extrusion direction. Interior threads 31 have been respectively cut into the inlet conduit 27, the outlet conduit 28 and the inlet conduit 29. In the exemplary embodiment in accordance with FIG. 2, the outlet conduit 30 is provided with an exterior thread 32. For this purpose, the rib 18 of the respective section 12, 13, 14 of the profiled element 10 is initially reshaped into a substantially cylindrical section, into which the exterior thread is then cut. The material to be removed in the course of reshaping the rib 18 of the respective section 12, 13, 14 of the profile 10 is relatively small, in particular if the section of the rib 18 has a square shape. Because the receiving bore 20, and also the inlet conduits 27, 29 and the outlet conduits 28, 30, extend transversely to the longitudinal direction of the ribs, i.e. transversely to the longitudinal direction of the profiled cast or extruded element 10, it is possible to apply the respective bores for a multitude of valve housings to the sections 12, 13, 14, etc. of the profiled element 10 before the profiled element 10 is cut into the individual sections 12, 13, 14. In this manner, it is possible to avoid a multitude of clamping processes, so that the processing time can be clearly reduced.

In connection with the exemplary embodiment in accordance with FIG. 3, which in its basic structure corresponds to the exemplary embodiment in accordance with FIGS. 1 and 2, the ribs 15, 16, 17, 18 have been processed on their exterior by reshaping by machining, in particular by turning on a lathe. The valve housing 11 is also a section 12, 13, 14 of a profiled extruded element 10, which has been provided, corresponding to the description of FIG. 2, with inlet conduits 27, 29 and outlet conduits 28, 30 and a receiving bore 20 for the valve elements extending transversely in respect thereto. The exterior contours constituted by the ribs 15, 16 of a section 12, 13 or 14 have been reshaped into hose connections 34. The ribs 17, 18 have been designed as connecting elements 35 for quick-release couplings. They contain a sealing ring 36 in their interior, in particular an O-ring, as well as an annular spring element 37, which engages slits. For example, it is possible to provide a quick-release coupling known under the trademark "Jiffy-Tite", or also any other quick-release coupling.

The valves represented in FIGS. 2 and 3 are used, for example, as thermostatic valves between an automatic transmission of a vehicle and an oil cooler. The inlet conduit 27 is connected with the outlet of the automatic transmission. The outlet 28 leads to the oil cooler. The inlet 29 returns to the oil cooler and leads to the outlet 30, which is again connected with the automatic transmission. A groove 33 has been cut into the receiving bore 20 on the side of the inlet conduit 27, through which an amount of leakage can flow directly from the inlet conduit 27 of the transmission as a bypass flow via the outlet conduit 30 back the transmission. Starting at a definite temperature, which can be selected by the layout of the thermostatic actuating element, the valve slider element 26 closes the area of the longitudinal groove, so that the entire amount of transmission oil flows through the oil cooler back into the transmission.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for producing multiple valve housings (11) by cutting respective multiple sections (12, 13, 14) from a billet material (10) extruded in an elongate extent thereof and by working into each of the sections inlet and outlet conduits (27, 28, 29, 30) substantially arranged in a common plane and a receiving bore (20) for at least one valve element (21, 26) extending transversely to the inlet and outlet conduits and substantially arranged in the common plane, characterized in that the billet material (10) is shaped as a substantially parallelepiped base body with ribs (15, 16, 17, 18) which project outwardly and at which ribs the inlet conduits (27, 29) and outlet conduits (28, 30) open, wherein the inlet conduits (27, 29) and the outlet conduits (28, 30) and the receiving bore (20) are formed in the billet material (10) transversely to the elongate extent thereof for each of the multiple sections (12, 13, 14) and thereafter the billet material (10) is cut transversely between the sections (12, 13, 14) to produce discrete individual valve housings (11).

2. The method in accordance with claim 1, characterized in that interior threads (31) are formed into at least one of the inlet conduits (27, 29) and outlet conduits (28, 30).

3. The method in accordance with claim 1, characterized in that one of the ribs is disposed in the area of at least one inlet conduit and outlet conduit (30) and is reshaped into a peg, which is provided with an exterior thread (32).

4. The method in accordance with claim 1, characterized in that one of the ribs is disposed in the area of at least one inlet conduit and outlet conduit (28, 29) and is reshaped into a hose connector (34).

5. The method in accordance with claim 1, characterized in that in one of the ribs is disposed in the area of at least one inlet conduit and outlet conduit (27, 30) and is reshaped into a connecting element (35) for a quick-release coupling.

* * * * *